US010540611B2

(12) United States Patent
Reese et al.

(10) Patent No.: US 10,540,611 B2
(45) Date of Patent: Jan. 21, 2020

(54) SCALABLE COMPLEX EVENT PROCESSING WITH PROBABILISTIC MACHINE LEARNING MODELS TO PREDICT SUBSEQUENT GEOLOCATIONS

(71) Applicant: RetailMeNot, Inc., Austin, TX (US)

(72) Inventors: David John Reese, Austin, TX (US); Annette M. Taberner-Miller, Austin, TX (US); Sankalp Acharya, Austin, TX (US); Lipphei Adam, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 724 days.

(21) Appl. No.: 15/147,519

(22) Filed: May 5, 2016

(65) Prior Publication Data

US 2016/0328661 A1    Nov. 10, 2016

Related U.S. Application Data

(60) Provisional application No. 62/156,949, filed on May 5, 2015.

(51) Int. Cl.
*G06N 20/00* (2019.01)
*G06N 7/00* (2006.01)
*G06F 16/29* (2019.01)

(52) U.S. Cl.
CPC .......... *G06N 20/00* (2019.01); *G06F 16/29* (2019.01); *G06N 7/005* (2013.01)

(58) Field of Classification Search
CPC ... G06F 17/30241; G06F 16/29; G06N 7/005; G06N 99/005; G06N 20/00; G06N 3/0445
See application file for complete search history.

(56) References Cited

U.S. PATENT DOCUMENTS 8,972,357 B2    3/2015 Shim et al.
9,064,326 B1 *  6/2015 Loxam ............... G06K 9/00671
(Continued)

OTHER PUBLICATIONS (Mathew et al., "Predicting Future Locations with Hidden Markov Model", Sep. 5-8, 2012, UbiComp '12, Proceedings of the 2012 ACM Conference on Ubiquitous Computing, pp. 1-8 (Year: 2012).*
(Continued)

*Primary Examiner* — Kamran Afshar
*Assistant Examiner* — Brent Johnston Hoover
(74) *Attorney, Agent, or Firm* — Pillsbury Winthrop Shaw Pittman, LLP

(57) ABSTRACT

Provided is a process, including: obtaining a set of historical geolocations; segmenting the historical geolocations into a plurality of temporal bins; determining pairwise transition probabilities between a set of geographic places based on the historical geolocations; configuring a compute cluster by assigning subsets of the transition probabilities to computing devices in the compute cluster; receiving a geolocation stream indicative of current geolocations of individuals; selecting a computing device in the compute cluster in response to determining that the computing device contain transition probabilities for the received respective geolocation; selecting transition probabilities applicable to the received respective geolocation from among the subset of transition probabilities assigned to the selected computing device; predicting a subsequent geographic place based on the selected transition probabilities.

21 Claims, 5 Drawing Sheets

(56) References Cited

U.S. PATENT DOCUMENTS

| | | | |
|---|---|---|---|
| 2009/0105934 | A1 | 4/2009 | Tajima et al. |
| 2010/0036601 | A1 | 2/2010 | Ozawa et al. |
| 2011/0071881 | A1 | 3/2011 | Zheng et al. |
| 2011/0313956 | A1* | 12/2011 | Abe .................. G06F 17/30241 706/12 |
| 2012/0136865 | A1 | 5/2012 | Blom et al. |
| 2013/0151453 | A1 | 6/2013 | Bhanot et al. |
| 2014/0068030 | A1* | 3/2014 | Chambers ........... H04L 41/0809 709/220 |
| 2014/0120559 | A1* | 5/2014 | Schaefer ............ G01N 33/6893 435/7.92 |
| 2014/0304545 | A1 | 10/2014 | Chen et al. |
| 2015/0073693 | A1 | 3/2015 | Yang et al. |
| 2015/0088792 | A1 | 3/2015 | O'Niell et al. |
| 2015/0095333 | A1 | 4/2015 | Porpora et al. |
| 2015/0288805 | A1 | 10/2015 | Ma et al. |
| 2015/0345967 | A1 | 12/2015 | Meuleau |
| 2016/0019298 | A1 | 1/2016 | Brodie et al. |
| 2016/0085810 | A1* | 3/2016 | de Castro Alves ......................... G06F 17/30516 707/752 |

OTHER PUBLICATIONS

Gambs et al., "Next Place Prediction using Mobility Markov Chains", Apr. 10, 2012, MPM '12 Proceedings of the First Workshop on Measurement, Privacy, and Mobility, ACM, Article No. 2, pp. 1-6 (Year: 2012).*

MacEachren et al., "New Methods for Representing and Interacting with Qualitative Geographic Information", Jun. 30, 2013, pp. 1-33 (Year: 2013).*

Lee et al., "Geopot: a Cloud-based geolocation data service for mobile applications", Aug. 2011, International Journal of Geographical Information Science, vol. 25, No. 8, pp. 1283-1301 (Year: 2011).*

Deshpande et al., "Selective Markov Models for Predicting Web-Page Accesses", May 2004, ACM Transactions on Internet Technology (TOIT) TOIT Homepage archive, vol. 4, Issue 2, pp. 1-15 (Year: 2004).*

Lee et al., "Interactive Control of Avatars Animated with Human Motion Data", Jul. 23-26, 2002, Proceedings of the 29th annual conference on Computer graphics and interactive techniques, pp. 491-500 (Year: 2002).*

Buluc et al., "Parallel sparse matrix-vector and matrix-transpose-vector multiplication using compressed sparse blocks", Aug. 11-13, 2009, Proceedings of the twenty-first annual symposium on Parallelism in algorithms and architectures, pp. 233-244 (Year: 2009).*

Kani et al., "Very short-term wind speed prediction: a new artificial neural network—Markov chain model", Jan. 2011, Energy Conversion and Management, vol. 52, Issue 1, pp. 738-745 (Year: 2011).*

Mahmood et al., "Improving recommender systems with adaptive conversational strategies", Jul. 2009, Proceedings of the 20th ACM conference on Hypertext and hypermedia, pp. 73-82 (Year: 2009).*

'The 8 Requirements of Real-Time Stream Processing', ACM SIGMOD Record, vol. 34 Issue 4, Dec. 1, 2005, pp. 42-47.

'Determination of Rule Patterns in Complex Event Processing Using Machine Learning Techniques', www.sciencedirect.com, Complex Adaptive Systems, Publication 5, Conference Organized by Missouri University of Science and Technology 2015, Procedia Computer Science 61, pp. 395-401.

'Foursquare has an amazing 'superpower' called Pilgrim that could finally let it take over your phone', http://www.businessinsider.com/inside-foursquares-pilgrim-technology-2015-12, Business Insider, Jan. 1, 2016, pp. 1 to 8.

'Next Place Prediction using Mobility Markov Chains', MPM '12 Proceedings of the First Workshop on Measurement, Privacy, and Mobility, ACM, Article No. 2, Apr. 10, 2012, pp. 1 to 6.

'Location Graph™ Technology', http://www.ninthdecimal.com/locationgraphtechnology/, NinthDecimal, May 4, 2015, pp. 1 to 3.

'Predicting Future Locations with Hidden Markov Model', UbiComp '12 Proceedings of the 2012 ACM Conference on Ubiquitous Computing, Sep. 5-8, 2012, pp. 1 to 8.

'RetailMeNot: Coupon Codes, Coupons, Promo Codes, Discounts', http://web.archive.org/web/20140505045648/http://www.retailmenot.com/, May 5, 2014, pp. 1 to 5.

International Search Report and Written Opinion for related PCT Application PCT/US2016/031024, dated Aug. 16, 2016, pp. 1 to 13.

International International Preliminary Report on Patentability for related PCT Application PCT/US2016/031024, dated Nov. 7, 2017, pp. 1 to 8.

European Search Report for Related EP Application No. 16790096.8, dated Dec. 13, 2018, pp. 1 to 11.

* cited by examiner

SCALABLE COMPLEX EVENT PROCESSING WITH PROBABILISTIC MACHINE LEARNING MODELS TO PREDICT SUBSEQUENT GEOLOCATIONS

CROSS-REFERENCE TO RELATED APPLICATIONS

This patent claims the benefit of U.S. Provisional Patent Application 62/156,949, titled "LOCATION-BASED PREDICTIVE RECOMMENDATIONS," filed 5 May 2015. The entire content of this earlier-filed application is hereby incorporated by reference.

BACKGROUND

1. Field

The present invention relates generally to predictive information retrieval system and, more specifically, to scalable complex event processing with probabilistic machine learning models to predict subsequent geolocations of individuals.

2. Description of the Related Art

Predictive information retrieval systems provide information to users without being asked. These systems attempt to predict which content a user would like to access, thereby relieving the user of the burden of specifying the content and helping users discover new content. For example, some existing systems attempt to predict new stories in which a user would be interested in advance of the user expressing such an interest. Using these predictions, some information retrieval systems predictively cache and display content on a user's computing device. As a result, the user may view, for instance, a list of notifications containing the content, and select among content with relatively little effort.

Often, a user's current and recent geolocation history provides a relatively strong signal regarding the type of content likely to be of interest to the user. Leveraging this information to provide relevant content predictably is often challenging with many traditional computer systems, as the number of dimensions to be considered can be relatively large over larger geographic areas, like an entire city, state, country, or continent, and the relevance of results often decays relatively rapidly as users move to other locations. Naïve, brute-force techniques for processing geolocation events with general-purpose computers are often slow and unreliable. Some systems attempt to expedite results by reducing the number of dimensions to be evaluated with hand-coded rules or patterns, but such systems can be exceedingly difficult and expensive to configure, as manual rule construction often requires excessive generalization, and can rely on rules that quickly become out of date. Further, individual general purpose computers are often incapable of processing rich pattern sets with sufficient latency in commercial applications, where the number of patterns may extend into the hundreds of thousands, the number of users may be in the millions, and the number of reported geolocations warranting processing against the rules may exceed several thousand per hour. Thus, many existing predictive information retrieval systems are not well-suited for certain types of large-scale, real-time local search problems.

SUMMARY

The following is a non-exhaustive listing of some aspects of the present techniques. These and other aspects are described in the following disclosure.

Some aspects include a process, including: obtaining a set of historical geolocations; segmenting the historical geolocations into a plurality of temporal bins; determining pair-wise transition probabilities between a set of geographic places based on the historical geolocations; configuring a compute cluster by assigning subsets of the transition probabilities to computing devices in the compute cluster; receiving a geolocation stream indicative of current geolocations of individuals; selecting a computing device in the compute cluster in response to determining that the computing device contain transition probabilities for the received respective geolocation; selecting transition probabilities applicable to the received respective geolocation from among the subset of transition probabilities assigned to the selected computing device; predicting a subsequent geographic place based on the selected transition probabilities.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
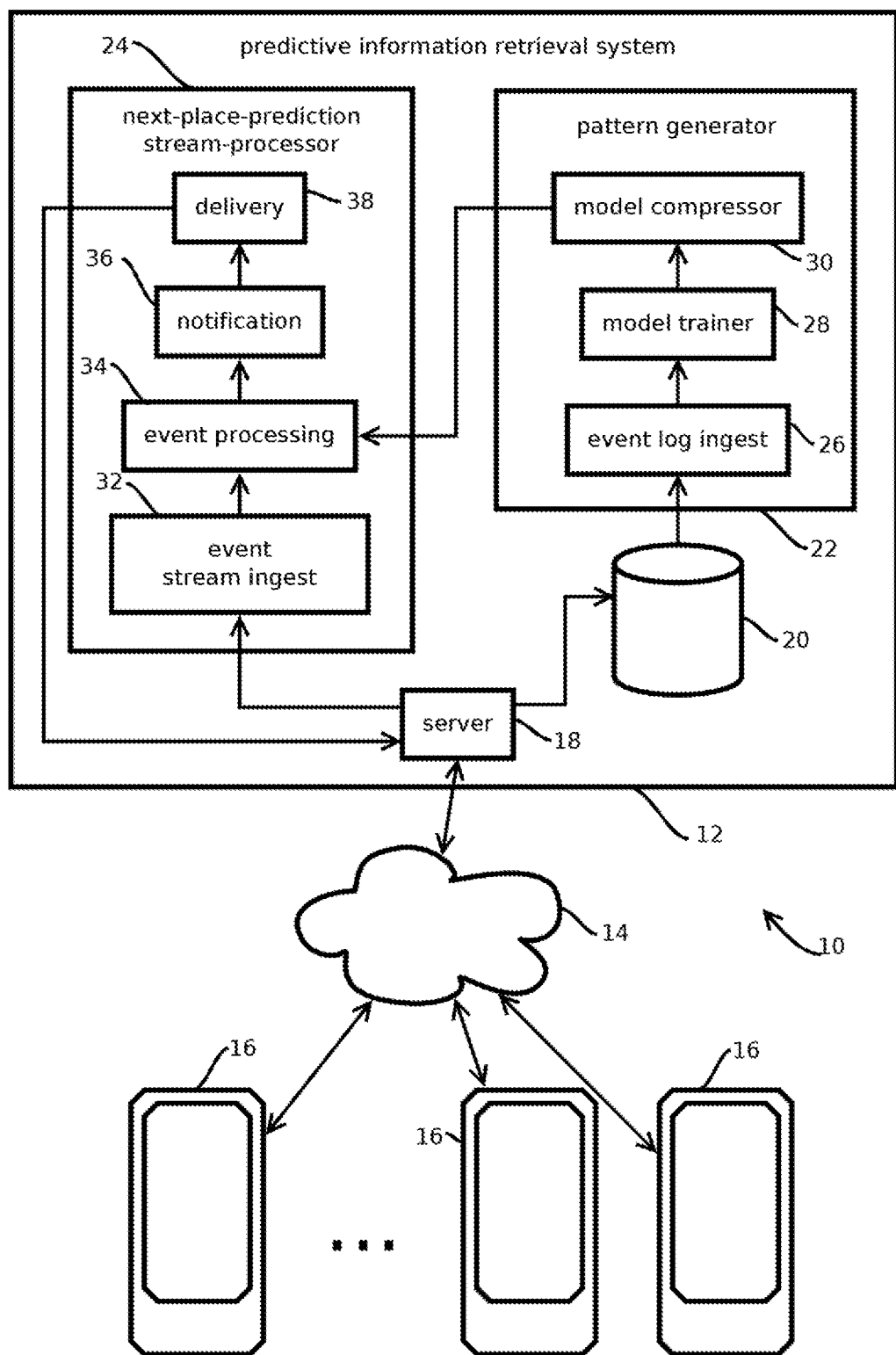
FIG. 1 shows the logical architecture of a predictive information retrieval system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of information retrieval. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a computing environment 10 having a predictive information retrieval system 12 that mitigates some, and in some cases all, of the above-described problems, as well as addresses several other weaknesses in traditional techniques described below. In some embodiments, the predictive information retrieval system 12 is operative to train machine learning models on historical geolocation data to construct predictive models that are location and time specific. It is expected that these models will be more accurate than traditional hand coded rules and particularly those rules constructed without regard to time. (Though, some embodiments may use hand-coded rules and rules constructed without regard to time, as several independently useful inventions are described.) In some embodiments, the models may be constructed in advance of making predictions, for example, as a batch process run nightly or weekly.

The resulting models, in some cases, may be loaded to a distributed complex event stream processing application that runs within a computing cluster configured to process relatively granular pattern descriptions (e.g., with more than 10,000 patterns) with relatively low latencies (e.g., within less than two minutes of receiving a geolocation event) at relatively large scales (e.g., at greater than 1,000 events per hour). In some embodiments, the architecture of the computing cluster is expected to provide real-time predictions relating to geolocation and corresponding content selection. In some embodiments, the compute cluster is configured to receive thousands of geolocation updates per hour and provide responsive predictions within seconds of receiving the corresponding geolocation update. As a result, some embodiments are expected to be capable of selecting content relevant to a user's future geolocation (e.g., near future geolocation, like next place visited, or place visited within some threshold duration, like two hours) relatively quickly after receiving a given user's current geolocation and to do so for relatively large user bases, for example, extending into the millions of users over a relatively large geographic area, like a continent.

In some embodiments, the computing environment 10 includes the predictive information retrieval system 12, the Internet 14, and a number of user computing devices 16, such as mobile computing devices, like tablets, cell phones, in-dash automotive computers, wearable computing devices, and the like. In some embodiments, the mobile computing devices 16 may periodically or intermittently report their geolocation to the predictive information retrieval system 12 via the Internet 14 and various wireless networks. Those geolocations may be logged and used to conduct construct predictive models. Further, such geolocations, in some cases, may be used to predict future geolocations of the individual based on the current geolocation and recent past geolocations. In some cases, the geolocations correspond to discrete geographic places, like businesses, parks, public facilities, government office buildings, residences, office buildings, and the like, or other geographic areas (e.g., of less than 1 square kilometer in size). In some cases, the places are sufficiently granular that each place has distinct characteristics, like corresponding to a single business, in contrast to larger areas like zip codes or cities that are substantially less indicative of a user's activities at the place. In some cases, each place corresponds to a business in a business listing in a geographic information system.

Or in some embodiments, places may be detected based on logged geolocation coordinates by clustering the coordinates in time and space. Some embodiments may execute a density-based clustering algorithm, like DBSCAN, to establish groups corresponding to the resulting clusters and exclude outliers. To cluster according to geolocation and time, some embodiments may iterate through each of the geolocations reflected in the records and designate a geolocation as a core geolocation if at least a threshold number of the other geolocations in the records are within a threshold geographic distance. Some embodiments may then iterate through each of the geolocations and create a graph of reachable geolocations, where nodes on the graph are identified in response to non-core corresponding geolocations being within a threshold distance of a core geolocation in the graph, and in response to core geolocations in the graph being reachable by other core geolocations in the graph, where geolocations are reachable from one another if there is a path from one geolocation to the other geolocation where every link in the path is a core geolocation and every link and path is within a threshold distance of one another. The set of nodes in each resulting graph, in some embodiments, may be designated as a cluster, and points excluded from the graphs may be designated as outliers that do not correspond to clusters.

Each cluster may be assigned a unique identifier and a bounding polygon to constitute one type of a record of a place. In some cases, bounding areas may be determined with a convex hull algorithm, e.g., based on angles between the geolocations. Some embodiments may select a geographic coordinate in a cluster, such as the southernmost geographic coordinate, and then determine an angle formed by that geographic coordinate and each of the other geographic coordinates in the cluster. The geographic coordinates of the cluster may then be sorted according to this angle. Embodiments may then iterate through the sorted sequence to determine whether a line between the two points preceding a given iteration indicate a left turn or a right turn. Upon determining that a left turn has incurred, the line between the points may be designated as indicating a portion of the convex hull. Or in another example, an embodiment may select the southernmost geographic coordinate among the coordinates of the cluster, determine the angle between that geographic coordinate and each of the other geolocation coordinates, and select a largest or smallest angle as indicating a portion of the convex hull. Embodiments may then proceed along that angled line to the other geographic coordinate and repeat the process, wrapping around the convex hull, until the first geographic coordinate is encountered. Some embodiments may produce a set of vertices corresponding to latitude and longitude coordinates that encompass the cluster. Or some embodiments may identify as the bounding area the segments having greater than a threshold density and being adjacent.

In some embodiments, the mobile computing devices 16 may communicate with the predictive information retrieval system 12 via various networks connected to the Internet 14, like wireless local area networks, cellular networks, and the like. In some embodiments, the mobile computing devices 16 may execute a special-purpose native application that periodically or intermittently polls a satellite navigation (e.g., global positioning system or GLONASS) sensor or other the geolocation service of the operating system of the respective mobile computing device and sends the responsive geolocation to the predictive information retrieval system 12. To conserve battery power of the mobile device, in some embodiments, the native application may access the CLVisit object in the corelocation framework of iOS™ and report identifiers of places visited and, in some cases, departure and arrival times. Unique identifiers of places can constitute a type of geolocation, as the value uniquely indicates a geographic place. In some embodiments, the same native mobile application may receive predicted content and present that predicted content to the user, for example, as a notification on the mobile computing device 16 or a wearable computing device connected via a personal area network, like via a Bluetooth™ network.

In some embodiments, the predictive information retrieval system 12 includes a server 18 a geolocation of event log 20, a pattern generator 22, and a next-place-prediction stream-processor 24. In some embodiments, the server 18 may receive network transmissions via the Internet 14 from the mobile computing devices 16 and route those communications to the appropriate component of the predictive information retrieval system 12. Further, in some embodiments, the server 18 may send predicted content to the corresponding mobile computing devices based on geolocations reported by those mobile computing devices. In some embodiments, the server 18 may be a non-blocking web server configured to service a relatively large number of sessions concurrently by using various proxies for results of slower operations, like promises, futures, deferreds, or delays rather than waiting for the slower operations. Or some embodiments may pre-fork client request to a plurality of blocking servers.

In some embodiments, the geolocation of event log 20 may hold a repository of historical geolocations reported by mobile computing devices 16 and indicating places visited by users of the respective mobile computing devices 16. In some embodiments, the geolocations are time stamped geolocations each associated with an anonymized unique user identifier (e.g. a MD5 hash of various attributes of a user profile). In some embodiments, the geolocations are expressed as latitude, longitude, and a radius confidence value. In other embodiments, the geolocations are expressed as time stamped identifiers of places visited during the time stamped. In some embodiments, each event is a place visit recorded with an anonymized user identifier an arrival time, and a departure time, and event sequences are an ordered list of events for an individual.

Thus, in some embodiments, the geolocation event log 20 may store records for a relatively large number of individuals, for example, more than 100,000 individuals, and each record may include a plurality of event sequences (e.g., one per day) visited by each of the corresponding individuals, as reported by their respective mobile computing device 16. Various techniques may be used to account for time between a sequence of visits to geographic places by an individual. To expedite operations, some embodiments may disregard time elapsed within a sequence within some duration, like within a day. Or some embodiments may determine whether the subsequent place is visited within a threshold duration of time, and a new sequence may begin once the threshold between visits has elapsed.

In some embodiments, geolocation sensed by the mobile computing devices 16 in the form of latitude and longitude coordinates may be correlated with corresponding places via the operating system of the mobile computing devices, for example, via a places visited application program interface (API) call, or in some embodiments, the latitude and longitudes may be associated with places by the predictive information retrieval system 12, e.g., by querying a geographic information system with a latitude and longitude. In some embodiments, consolidating a collection of clustered timestamps and latitude and longitude geolocation readings into discrete events indicating a visit to a given place is expected to compress the data and facilitate richer analyses and faster analyses with a given amount of computing resources. That said, some embodiments may also operate on latitude and longitude coordinates.

In some embodiments, the pattern generator 22 may execute a process described below with reference to FIG. 3 to detect patterns (e.g., correlations between past and future behavior by individuals) in the records of the geolocation event log 20. In some embodiments, the pattern generator 22 may run a batch process periodically, for example nightly, weekly, or monthly to process a trailing duration geolocation of event log records, for example, those obtained within the previous day, week, month, or year. In some embodiments, the dimensionality and number of the geolocation records may be relatively high and substantially more than a single computing device can process in a reasonable amount of time (e.g., before the next batch process is scheduled), so some embodiments may implement a distributed machine learning processing model on a compute cluster described in greater detail below with reference to FIG. 3, e.g., with the Hadoop™ framework, using a distributed file system and MapReduce processing to effectuate concurrent processing over a relatively large number of computers. Some embodiments may use other frameworks, e.g., Apache Spark™ or Apache Spark Steaming™, or other approaches.

In some embodiments, the pattern generator 22 may include an event log ingest 26, a model trainer 28, and a model compressor 30. In some embodiments, a relatively large number of models may be trained by discovering patterns in the geolocation event logs. In some cases, the number and dimensionality of the models may be relatively large and more than a typical computing device can store in system memory or efficiently distribute via a network. Accordingly, some embodiments may compress the resulting models, and the output compressed models may be provided to the next-place-prediction stream-processor 24 for real-time processing of subsequently arriving geolocation events indicating a user's current geolocations. Model compression may include pruning a probability matrix (e.g., by setting values less than a threshold to zero) to form a sparse matrix and, then, compressing the matrix into three vectors with compressed sparse row or compressed sparse column compression. Similarly, parameters of neural nets may be compressed with a HashedNets architecture or similar techniques.

In some embodiments, the stream processor 24 may provide real-time responses to incoming geolocation events. What qualifies as real time depends upon the use case. For example, some embodiments may aggregate predicted visits and generate an alarm or report to businesses indicative of an amount of people expected to arrive in the near future, so that the corresponding business can adjust staffing levels to respond. In such use cases, given the lag time required to respond, some embodiments may update predictions relatively quickly, for example, within less than two minutes of receiving a given geolocation event. In other use cases, some embodiments may predictably provide content relevant to the subsequent geolocation, for example, user reviews or ratings, new stories, coupons, gift card offers, deals, maps, contact information, routing information, and the like. In some cases, such embodiments may predictably provide such content even more quickly in an attempt to influence the user's behavior, for example within less than two minutes, like less than five seconds or less than 500 milliseconds, for instance, when predictively selecting content in response to a newly initiated session with a client device. Some embodiments may operate with more relaxed time constraints while still constituting a real time processing, for example, by providing predictions and content selected based on those predictions within less than a half hour of receiving a given geolocation event indicating a user's current geolocation.

In some embodiments, the stream processor 24 may be implemented with an architecture described below with reference to FIG. 2 and may execute a process described below with reference to FIG. 4. In some cases, the architecture may facilitate operations on relatively large streams of geolocation data for relatively large users with relatively low latency responses according to relatively high granularity, rich sets of models of patterns in geolocation sequences.

In some embodiments, the stream processor 24 may include an event stream ingest module 32, an event processing module 34, a notification module 36, and the delivery module 38. In some embodiments, the server 18 may route incoming geolocation events (e.g., indications from one of the mobile computing devices 16 that the mobile computing device is currently at a geolocation, such as a given place), to both the event stream ingest module 32 and the geolocation event log 20, the latter of which may update a record and store the event for subsequent training and updates to models. In some cases, such events may arrive at a relatively high rate, for example, more than 1,000 per hour, and in some cases more than 10,000 per hour. In some embodiments, the ingest module 32 may parse relevant fields from the incoming stream used in subsequent event processing, like a timestamp, an indication of the place, and a user identifier.

In some cases, the ingest module 32 may join the incoming data with other data sources, for example, translating geolocation latitude and longitude measurements into place identifiers. In some embodiments, the ingest module 32 may query other real time data sources or streams, such as data repositories indicating other contextual information, like traffic patterns, weather, and the like, and enrich the event with corresponding data, like weather or traffic at the location specified, or attributes of the location or user. The responsive data corresponding to the receive geolocation may be joined with the geolocation in the event stream. In some cases, a stream may be emitted by the ingest module 32, such as a sequence of tuples having a list of values with the position of the values in the list indicative of the corresponding field, thereby conserving network and memory use by avoiding, applying, and carrying through labels. Or some embodiments may serialize and explicitly label the data, for example, in a serialized data format, like JavaScript object notation (JSON) or extensible markup language (XML).

Next, the event processing module 34 may receive the stream emitted by the ingest module 32 and detect patterns in the stream by comparing the stream to the patterns specified in the models trained by the pattern generator 22. In some cases, event processing 34 may be performed in a parallelized architecture like that described below with reference to FIG. 2 with different sets of patterns grouped according to geolocation or time mapped to different members of the computing cluster, thereby freeing the system from the resource constraints imposed by the addressable memory in a single computing device. In some cases, it is expected that the models will in the aggregate consume a relatively large amount of memory, in some embodiments, extending into the hundreds of gigabytes or terabytes, thereby making it difficult for a single computing device to hold, operate on, and regularly refresh every model trained by the pattern generator 22.

In some embodiments, the event processing module 34 may emit a stream of detected patterns to the notification module 36. In some embodiments, the notification module may be operative to determine whether the patterns are actionable, e.g., whether the event (and sequence of preceding events for the individual in some cases) matches a pattern having sufficient predictive power regarding a subsequent place to be visited. In some cases, the notification module may determine whether greater than a threshold amount of time has elapsed since the given individual received the notification to rate limit notifications and avoid annoying users. In some embodiments, the notification module 36 may be operative to detect and filter according to even more detailed patterns, for example, determining whether a given pattern has been detected for a given individual within a previous duration or on a given day and whether the user responded to that pattern was some indication they appreciated the notification, for example by engaging with content. In some embodiments, in response to detecting a pattern indicative of user engagement, the current detected pattern may be permitted to yield another instance of the notification or adjust (e.g., lower) a threshold for deeming a match sufficiently likely to indicate a subsequent action by the user.

Notifications may be sent to client devices and presented with a variety of techniques. The present patent incorporates by reference the disclosure of U.S. patent application Ser. No. 14/661,392, titled "Caching Geolocated Offers," filed 18 Mar. 2015, which describes various techniques by which notifications may be cached or selected and techniques by which a user's visitation patterns may be observed. In some cases, the offer distribution system of the '392 application may include a predictive offer recommendation module that implements the functionality described herein.

In some embodiments, the delivery module 38 may be operative to select content and send that content to the server 18 for delivery to the corresponding mobile computing device that emitted the geolocation event corresponding to the detected pattern. A variety of techniques may be used to select content, including those described in the '392 application. In some embodiments, content may be selected based on a predicted geolocation, which may be a predicted place to be visited by the user. In some cases, the content may be selected based on attributes of the place, like a name of a business or attributes of the business in a taxonomy of businesses, like a category of goods or services offered by the business. For example, some embodiments may select coupons, offers, deals, or gift card offers (e.g., offers to purchase an extant gift card on an online gift card exchange) pertaining to a business (or competitor or complementary business of) the user is predicted to be visiting next. Or some embodiments may request a route to the subsequent business from a current user's current geolocation and the route may be sent. Some embodiments may request reviews pertaining to a business at the predicted next place the user will visit and those reviews may be sent. In some cases, selecting content may include obtaining a collection of candidate content, such as a plurality of reviews, offers, routes, news stories, and the like pertaining to a place to be visited next, and some embodiments may rank and select among those candidate instances of content, in some cases based on the specific pattern detected. For example, the pattern by which a user is determined to be likely to visit a subsequent place of interest may also indicate what a user intends to do at that place of interest. By way of example, a user may visit a particular drycleaners location after visiting a particular gas station, and some embodiments may have determined based on patterns from a population of users that a particular grocery store is a likely subsequent place for the user to visit. In response, content pertaining to that grocery store may be selected. In some embodiments, a hidden Markov model may be constructed and used to predict places visited (e.g., as an observed variable) and classify user intent according to a taxonomy of intent (e.g., as a hidden variable).

Figure 2:
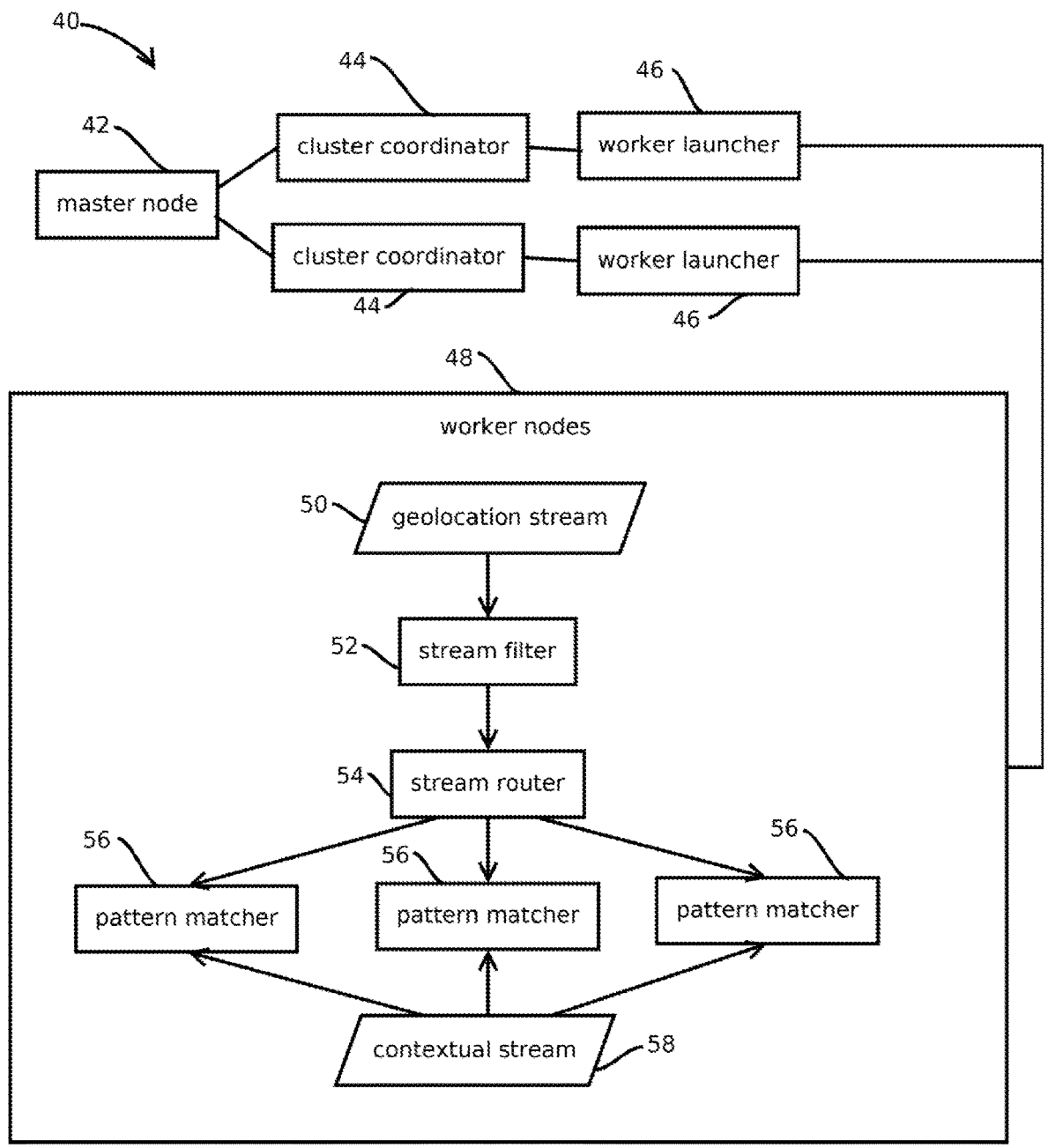
FIG. 2 shows the logical architecture of a compute cluster by which models are trained for the system of FIG. 1.

FIG. 2 shows a logical architecture of a computing cluster configured to implement the above-described stream processor 24. In some embodiments the logical architecture 40 may provide distributed real-time processing of relatively large streams of incoming geolocation events. Further, in some embodiments, the architecture 40 may be relatively robust to individual nodes of the compute cluster failing, as becomes increasingly likely as the number of nodes is increased with commodity processing hardware. In some embodiments, the number of computing devices may be relatively large, for example, more than five, more than 10, more than 40, or more than 400. In some embodiments, each computing device may have a distinct memory address space from the other computing devices. In some embodiments, some of the computing devices may run virtualized operating systems each having its own distinct address space, and some of the virtual machines may execute some or multiple instances of the components described herein.

In some embodiments, the logical architecture 40 may include a master node, which in some embodiments may execute a daemon, such as a Nimbus or job trackers daemon. In some embodiments, the daemon may be configured to distribute code to other nodes within the cluster, assigned tasks to other nodes in the cluster, and monitor the other nodes for hardware failures. In some embodiments, the master node 42 may control cluster coordinators 44 and worker launchers 46 that collectively cooperate to control, monitor, and configure worker nodes 48. In some embodiments, each worker node may execute a daemon that listens for work assigned to the respective node and starts and stops worker processes based on the instructions of the master node. In some cases, the cluster coordinators 44 may coordinate between the master node and the worker nodes, in some cases, tracking and registering the operations of the worker nodes.

In some embodiments, the logical architecture may implement the Apache Spark Streaming framework. In some cases, an input stream may be accumulated in buffers, and data in the buffer may be discretized into batches for subsequent processing. A framework engine may execute tasks to process the batches, e.g., tasks taking less than 100 milliseconds, and output results. In some cases, the tasks may be dynamically assigned to worker nodes, e.g., based on whether relevant data is local to the respective nodes and available resources offered by the respective nodes. Batching is expected to provide for relatively fine-grained allocation of computational resources to expedite operations. Further, batching is expected to render operations more fault tolerant to the failure of any one node, as the batch can be re-executed (e.g., in parallel) without replaying the stream, though not all embodiments provide this benefit. In some cases, the stream may be structured as a distributed stream having a sequence of resilient distributed datasets (RDDs), which may be a read-only set of data items distributed over a cluster of nodes stored in a fault-tolerant distributed data structure.

In some embodiments, the worker nodes may be arranged in an application-specific topology, where data streams extend between the nodes in the topology, and data is processed as it flows through the topology, e.g., in a parallelized pipeline configured to facilitate concurrent operations on relatively large data streams. In some cases, the worker nodes (e.g., computing devices, or threads executing thereon) may operate on a data stream indefinitely, in contrast to certain batch processes like traditional MapReduce implementations that execute and then complete. In some embodiments, the worker nodes may be characterized as ingest modules, such as spouts, and processing modules, such as bolts or transformers. In some cases, the architecture 40 may be constructed with an elastically scalable distributed stream processing framework, like Apache Storm or Fink.

In the illustrated topology, a geolocation stream 50 may be ingested, for example, from the server 18 described above. Some embodiments may include one or more worker nodes that execute a stream filter 52. In some embodiments, the stream filter may parse from the stream data pertinent to patterns to be matched, such as parsing from the stream of events or event records, each event record having a anonymize user identifier a geographic place (or latitude and longitude), and a timestamp. In some embodiments, the stream filter may emit a stream to the stream router 54. In some embodiments, the stream router 54 may multiplex the incoming stream to various pattern matcher worker nodes 56. In some embodiments, the number of patterns to be matched may exceed the memory resources available on an individual computing device. Some embodiments may divide the patterns by the geographic area or time, or both, to which the patterns pertain. For instance, patterns for a given city or state may be routed to one machine, while patterns for another geographic area, like city or state may be stored on a different machine. Geographic events in the stream may be routed to the pattern matcher worker node 56 having the patterns for that respective geographic area. In some embodiments, the routing may be performed by passing through one or one or more fields of geographic event records through a hash function (e.g., a hash function with an output range that enumerates identifiers of the pattern matcher worker nodes 56), and assigning a worker node based on the resulting hash value. In some embodiments, a threshold number of significant digits of a latitude or longitude may determine the pattern matcher worker node 56 to which a geographic event record is routed. The stream router 54 may emit a plurality of streams to each of the pattern matcher nodes 56. Three pattern matcher nodes 56 are illustrated, but commercial embodiments are expected to have substantially more.

Concurrently, the pattern matcher nodes 56 may apply various models trained by the pattern generator 22 described above to detect patterns in the incoming streams. In some cases, the pattern may correspond to a current place the user is visiting and a previous place the specific user visited. In some embodiments, the pattern matcher nodes 56 or one of the upstream components, 52 or 54, may query the geolocation event log 22 and enrich the geolocation invent record with a (e.g., consecutive) sequence of previous geolocations visited by the individual. In some embodiments, the pattern matcher node 56 may determine a predicted subsequent geographic place to be visited by the user based on matches to patterns. Examples of such matches are described below with reference to FIG. 4. In some embodiments, the pattern matcher nodes 56 may detect patterns in geolocation event records that are enriched in various ways. For example, in some embodiments, the geolocation event records may be enriched with one or more contextual streams 58. Examples of such contextual streams include information about the geographic area, like weather conditions, traffic conditions, and the like. In some embodiments, the match patterns may also account for such contextual information, e.g., by weighting probabilities, or selecting conditional probabilities that account for the context.

In some cases, the streams encode asynchronously generated events, in contrast to systems that periodically query a database to synchronously access data. Processing asynchronous event streams is expected to yield lower latency responses relative to synchronous systems, though some embodiments are also consistent with a synchronous approach. In some cases, the nodes communicate with one another via remote procedure calls (RPC), e.g., using the Apache Thrift framework. In some cases, RPC messages are asynchronously queued between client applications and messaging systems. Or some embodiments may convey messages with protocol buffers. Or, some embodiments may operate on batches, e.g., a series of RDDs.

Figure 3:
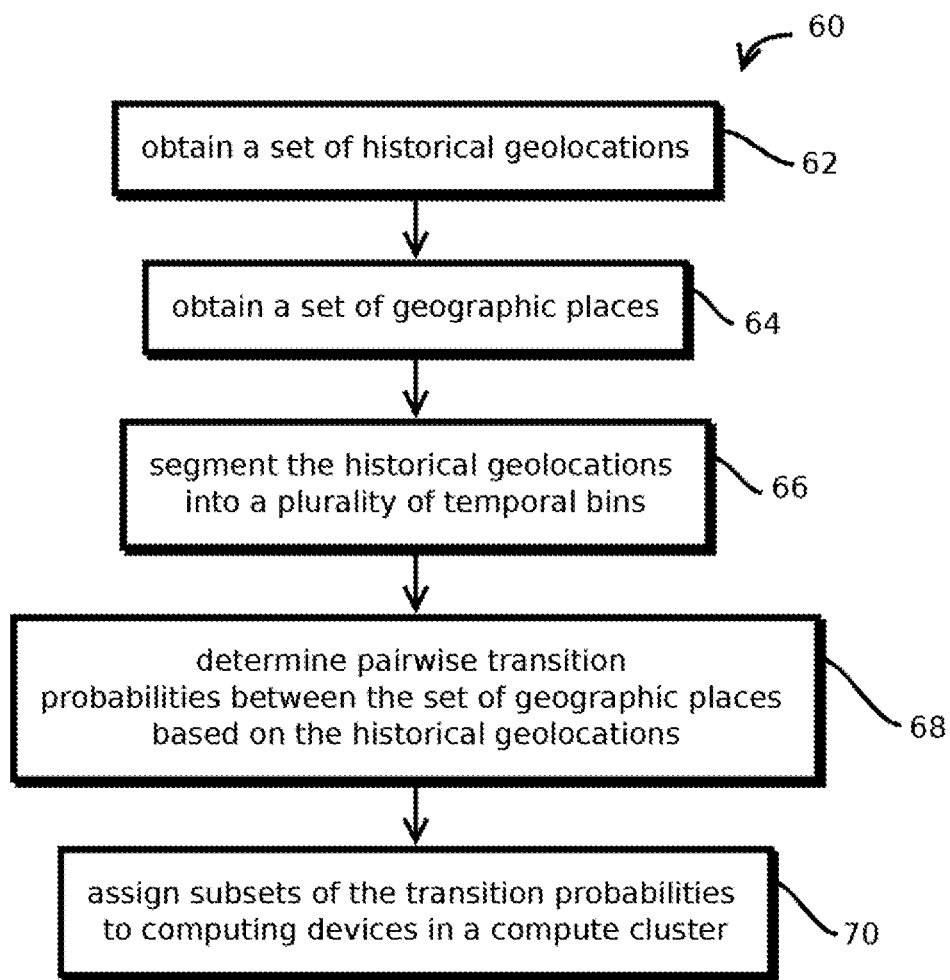
FIG. 3 shows a flowchart of a process by which models are trained for the system of FIG. 1.

FIG. 3 illustrates an example of a process 60 to train and compress models, for example with the above-describe pattern generator 22, though embodiments are not limited to that implementation. In some embodiments, the process 60 includes obtaining a set of historical geolocations, as indicated by block 62. In some embodiments, this step may be performed by the above-described geolocation event log 20. In some cases, the process 60 may further include obtaining a set of geographic places, as indicated by block 64. In some embodiments, the places may be places visited in the historical geolocations, or a list of places to which geolocations are mapped. In some embodiments, the geographic places are discrete businesses.

In some embodiments, the process 60 may further include segmenting the historical geolocations into a plurality of temporal bins, as indicated by block 66. In some embodiments, this step 66 may include grouping the historical geolocations by day of the week, hour of the day, time of year, or other periodically repeating duration of time. Often, the patterns in which users engage in their geolocation visits depends in part on the time of day, day week, or month of year, making time-specific predictions potentially more accurate. In some cases, step 66 may produce a plurality of collections of the historical geolocations, each collection having historical geolocations with the timestamp falling after a start time of a corresponding temporal bin and a before an end time of a corresponding temporal bin.

Next, some embodiments may determine pairwise transition probabilities between the set of geographic places based on the historical geolocations, as indicated by block 68. In some embodiments, the transition probabilities may be arranged in a matrix having a first dimension corresponding to a previous place visited by a user and a second dimension corresponding to a subsequent place visited by a user, with the previous and subsequent places being consecutively visited in some cases. Some embodiments may include higher dimensional matrices, for example, a matrix having a third dimension corresponding to a geographic place visited even earlier in a consecutive sequence. Some embodiments may extend this pattern into four dimensional, five dimensional or higher dimensional matrices.

Values of the matrix may indicate the probability of transitioning to a subsequent place given the sequence of previously visited places indicated by the other dimensions of the matrix. For example, rows of the matrix may indicate a previously visited place, columns of the matrix may indicate a subsequently visited place, and a value at a given row and column may indicate the probability of transitioning from one to the other. In a three-dimensional version, each layer may indicate changes in those probabilities as a conditional probability given a visit to a particular even earlier place.

Thus, in some embodiments, the values may be conditional probabilities given a sequence of previous visits to places. In some embodiments, the matrix may include additional dimensions indicative of other attributes, like attributes of a user in the user profile. In some embodiments, each segment of historical geolocations may be used to generate a segment specific transition matrix and the probabilities may reflect the probability of transitioning along a particular sequence to a subsequent place during the time corresponding to the segment. Some embodiments may construct a transition probability matrix for each time bin based on events records falling within the respective time bin. Thus, multiple transition probability matrices may be generated.

Various techniques may be used to calculate transition probabilities. In some cases, the transition matrix may be characterized as having a set of past dimensions and one (and in some cases more) subsequent dimensions. The position of a value in the matrix may, thus, correlate to a sequence of past geographic places and one subsequent geographic place, with the value indicating the conditional probability of an individual transitioning to the subsequent geographic place given that the user has transitioned through the sequence of previous (which may include a current) geographic places.

In some embodiments, for each sequence specified by a given sequence of past geographic places, the set of transition probabilities for the subsequent geographic place dimensions may be determined based on the geolocation event log records. In some embodiments, the event log may be queried for sequences matching the given sequence of past geographic places (e.g., some embodiments may iterate through every permutation of possible sequences (like up to n, where n is an integer, for instance 2, 3, or 4) to obtain respective given sequences for constructing the matrix). The transition probabilities may be determined based on the responsive sequences, which may indicate the subsequent geographic place, following the given past sequence, in the event log. In some cases, the query response may be grouped according to the subsequent geographic place in the log record (e.g., a consecutive subsequent place). Some embodiments may count the total number of query results and the number of results in each group corresponding to respective subsequent geographic places. The transition probabilities may be determined based on these two counts, e.g., for a given sequence, as the number in the group for a given place divided by the total number responsive to the query for the given past sequence.

In an illustrative example (that is substantially more simple than commercial implementations expected to benefit from other inventions described herein), models may be constructed to predict movement between three brick and mortar businesses: Al's Ice Cream Shop (A); Barry's Dry Cleaners (B); and Carl's Piñata Emporium (C). In this example, the event log may contain historical data as follows: sequence_1, User1, 2 days ago, transitioned from A to C to A (i.e., A-->C-->A); sequence_2 User_1, 1 day ago, A-->C-->B; sequence_3, User_2, 2 days ago, C-->B-->C;

sequence_4, User_2, 1 day ago, B-->C; sequence_5, User_3, 2 days ago, A-->C-->B-->A; and sequence_6, User_3, 1 day ago, C-->A. These values may constitute tuples, where the first position is reserved for a unique sequence identifier, the second position for a unique user identifier, the third position for an age of the sequence, and the fourth position for an ordered list of places visited in the sequence.

In some cases, the conditional probably may be based on a sequence of two previous places. In the example above, the transition probability of moving from A to C to B may be determined by 1) querying the records for those having this sequence. Responsive data may include sequences 1, 2, and 5. In this example, three records are responsive. The subsequent place of B corresponds to two of the results, indicating a transition probability of ⅔ or approximately 66%, given that the user previously went to A and C. In this example, the transition probability to A is ⅓, or approximately 33%. The value for C in this example may be set to zero or null, indicating that the transition from C to C does not have meaning in this embodiment of the model. A similar process may be repeated for each permutation of previous place sequences to populate the transition probability matrix.

In some cases, different conditional probabilities may be determined and combined in predictions, with the different conditional probabilities specifying different sized previous sequences. For instance, a transition probability matrix may be determined for a sequence of three previous places, two previous places, and one previous (e.g., current) place. Or, to conserve memory, transition probabilities in a higher dimensional matrix may be consolidated (e.g., with addition) over a dimension corresponding to a trailing previous place visit in a sequence. For instance, where a transition matrix contains conditional probabilities for three previous visits, and only two previous visits are available for a given user, the values in the transition matrix may be summed along the dimension corresponding to the last previous visit in the sequence to produce conditional probabilities corresponding to two, rather than three, previous visits in a sequence. For similar reasons, some embodiments may avoid accounting for places that have a user-specific semantic value, e.g., "home" or "work," as tracking such places can lead to an explosion in dimensionality and can slow operation of the computers training and applying models. (That said, some embodiments may track these types of places as well, as various engineering and cost tradeoffs are envisioned.)

Data need not be formatted as a matrix to constitute a matrix. In some embodiments, values may be arranged in a matrix without referring to the data structure as a matrix in code. For example, matrices may be encoded in various forms, including object oriented data structures, collections of arrays or lists, tuples, graphs, and the like. Similarly, a three dimensional matrix and higher may be expressed in code as a two dimensional matrix by flattening the matrix (e.g., each row of a two dimensional matrix in code may specify a sequence of two previous visits, thereby constituting a three dimensional matrix that happens to be encoded in a two-dimensional format).

In some embodiments, the transition matrices may be relatively large. For example, the transition matrix may encode a complete digraph of every one of a set of geographic places (e.g., with N*(N−1) edges, where N is the number of places), or three-dimensional matrix may encode a complete trigraph of the set of geographic places. Thus, complexity and memory consumption may scale increasing poorly as the number of places increases, though this effect may be mitigated with some of the techniques described herein. In some embodiments, the resulting matrices may be too large to fit within the memory of an individual computing device, and both the generation of the transition probabilities and their use may be implemented in a distributed fashion over a compute cluster. Further, some embodiments may compress the models.

For example, in one embodiment, the transition probabilities may be determined with a Hadoop™ compute cluster executing a MapReduce algorithm and storing the set of historical geolocations in a distributed file system implemented within the compute cluster. In another example, the transition probabilities may be determined with an Apache Spark™ or Apache Spark Streaming™ compute cluster. As a result, the transition probabilities may be calculated concurrently and relatively quickly with reasonable amounts of computing resources available to individual computing devices of the compute cluster. In some cases, the historical geolocations may be grouped by geographic region, and each geographic region may be assigned to a different one of the computers in the compute cluster. Some embodiments may discard region-to-region transitions (which are expected to be relatively rare and anomalous) to expedite operations. Or some embodiments may account for such transitions, e.g., to target content to tourists.

Other embodiments may train other types of models. For instance, a recurrent neural net or feedforward neural net may be trained on the historical data, e.g., by executing a stochastic gradient descent algorithm. In some embodiments, some or all of the weights or coefficients described herein may be calculated by executing a machine learning algorithm on a training set of the historical geolocation sequences. Some embodiments may execute a gradient descent optimization to reduce the error rate and select appropriate weighting and the threshold values. Some embodiments may construct the model by, for example, assigning randomly selected weights; calculating an error amount with which the model describes the historical data and a rates of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or thresholds, may be stored in memory and loaded to the stream processor. In some cases, a subset of the training set may be withheld in each of several iterations of training the model to cross validate the model by repeating the training on different subsets and determining a difference between trained models or by comparing predicted values in withheld subsets to actual values.

To use the resulting transition probabilities, some embodiments may assign subsets of the transition probabilities to computing devices in a different compute cluster, as indicated by block 70. In some embodiments, the computing devices in the compute cluster may be a different compute cluster configured for stream processing rather than batch processing, one example being the computing environment and architecture 40 described above with reference to FIG.

2. (Though, both clusters may be batch processing clusters in some embodiments.) In some embodiments, the various pattern matcher worker nodes 56 may each be assigned subsets of the transition probabilities, for example, transition probabilities pertaining to a particular segment of time, a particular geographic area, or a combination thereof, to distribute memory and processing load among a plurality of devices and render larger-scale implementations feasible.

In some embodiments, various techniques may be used to compress or further process the transition probabilities. In some cases, even with the use of compute clusters, the transition probability matrix may be still too large and unwieldy. In some embodiments, the transition probability matrix may be pruned by setting transition probabilities with values less than a threshold to zero. Then, the resulting matrix, which is expected to be a relatively sparse matrix, may be compressed, for instance into three vectors per two-dimensional matrix slice, e.g., in a compressed sparse row or column format.

In another example, the transition probability matrix may be used to generate rules. For example, the dimensions of the matrix may be consolidated by category of place, and a measure of the resulting measure of central tendency of transition probabilities within the category may be compared to a threshold. Those that satisfy the threshold may specify a rule, such as a sequence of categories of places that predict a subsequent category of place or a subsequent particular place. Because each category of place aggregates a number of places, the rule set may be reduced in size.

A variety of models may be built based on the transition probabilities. In some embodiments, the transition probabilities may be transition probabilities within a Markov model, such as a hidden Markov model. In some embodiments, the user's intent or other hidden context variables may be accounted for (e.g., inferred) by the hidden Markov model in accordance with the transition probabilities to make subsequent predictions. In some embodiments, the reported geolocations may be the observed variable and the individual's underlying intent may serve as the hidden variable of a hidden Markov model having a chain of states (e.g., places visited). In some cases, each hidden state may be mapped to corresponding content. In some embodiments, the model may be trained with the Baum-Welch algorithm. The individual's intent may be inferred with the Viterbi algorithm.

In some embodiments, the transition probabilities may be encoded in a recurrent neural net having a directed cyclical collection of neurons that encode previous places a user has visited, with weights of the recurrent neural net corresponding to, and constituting and implicitly encoding, the transition probabilities. Some embodiments may implicitly determine the transition probabilities by determining parameters of a recurrent neural network. In some embodiments, the neural network may have a hidden layer with a directed cycle in a hidden layer wherein the output of a given neuron may be fed back into the input of a neuron that outputs, either directly or indirectly to the input of the given neuron. In some cases, the recurrent neural network may be a discrete time recurrent neural network, where each time step corresponds to a transition along a sequence of places visited (and may not necessarily correspond to an amount of time there between). In some cases, the recurrent neural network may be trained with backpropagation through time, realtime recurrent learning, an extended Kalman filter, or the like. For instance, some embodiments may unfold the directed cycle and train the resulting feedforward neural network with the above described gradient descent techniques.

Other embodiments may train and employ other types of models to predict future geolocations with time series data, e.g., decision trees, principle component analysis, feedforward neural nets, and the like.

Figure 4:
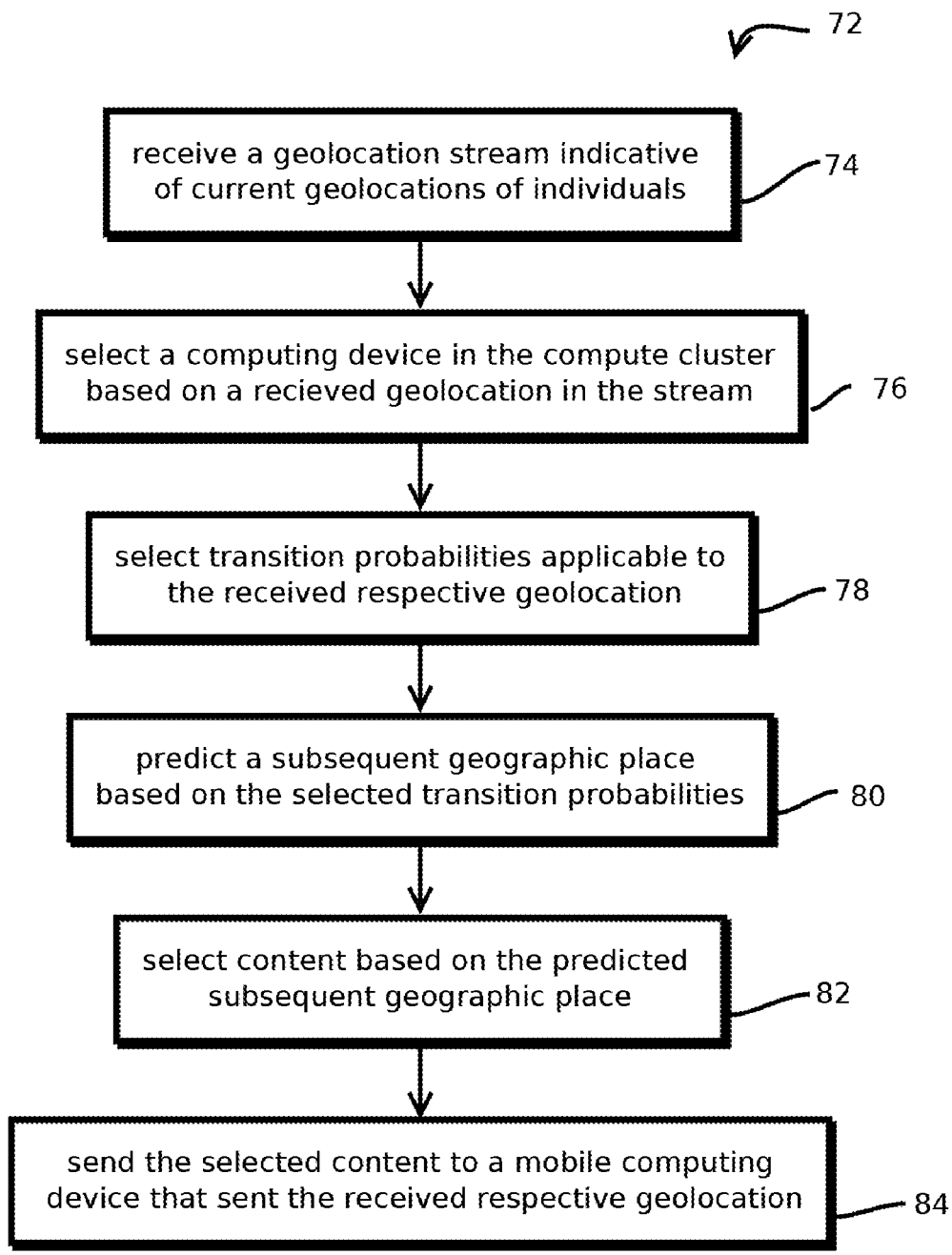
FIG. 4 shows a flowchart of a process by which models are used by the system of FIG. 1 to predictively determine subsequent geolocations of individuals based on the models trained with the process of FIG. 3.

FIG. 4 illustrates an example of a process 72 configured to predictively send content based on a user's current and past geolocations and the models trained with the process of FIG. 3. In some embodiments, the process 72 may be executed by the above-described stream processor 24, for instance, with the logical architecture 40 of FIG. 2. Some embodiments may include receiving a geolocation stream indicative of current geolocations of individuals, as indicated by block 74. In some embodiments, the stream may be a sequence of structured data that arrives unpredictably over time for an indefinite amount of time extending into the future (e.g., more than ten hours), in contrast to individual requests that are relatively finite and contained and may arrive synchronously.

Next, some embodiments may select the computing device in the compute cluster based on a received geolocation in the stream, as indicated by block 76. As noted above, different models corresponding to different geographic areas in the transition probability matrix may be assigned to different computing devices to facilitate current operation and share the load of storing and processing the various models. In some embodiments, selecting a computing device may include parsing a particular field (or set of fields) from a geolocation event record and selecting the computing device based on the field or fields, for instance by hashing a time, place, geographic coordinate, or combination thereof. In some embodiments, the geolocation event record may be sent to the selected computing device with a remote procedure call, such as a remote procedure call sent according to the Thrift protocol or a protocol buffer. Or some embodiments may otherwise execute the entirety of the processes of FIGS. 3 and 4 on a single computing device, within a single memory address space, which is not to imply that any other feature may not also be omitted in some embodiments.

Next, some embodiments may select transition probabilities applicable to the received respective geolocation, as indicated by block 78. In some embodiments, selecting transition probabilities may include accessing a transition matrix to retrieve values corresponding to a place in a currently received geolocation of event record, such as a previous place, and in some cases, a sequence of a plurality of previous places. In some embodiments, selecting transition probabilities may constitute calculating outputs of neurons in a recursive neural net based on the transition probabilities, or in some cases, selecting transition probabilities may by performed by selecting a rule constructed based on the transition probabilities, such as a rule that consolidates a plurality of paths from transition probabilities based on attributes of the places. In some embodiments, probabilities are selected by accessing values along a particular dimension of a matrix, e.g. the values in a row or column corresponding to a list of candidate subsequent places, like along a plane specified by a sequence of previous places.

Next, some embodiments may predict a subsequent geographic place based on the selected transition probabilities, as indicated by block 80. Predicting a subsequent geographic place may include ranking the values of the selected transition probabilities and selecting the subsequent geographic place corresponding to the highest value. For instance, some embodiments may determine which geographic place corresponds to a dimension in the transition matrix at which the highest value is positioned. Or in some cases, predicting the subsequent geographic place may include activating a neuron (or neuron output) in a recurrent neural network corresponding to the subsequent geographic place or determining the result of one of the above-described rules.

In some embodiments, a plurality of subsequent geographic places are predicted, each with different probabilities associated therewith. In some embodiments, the subsequent geographic place is selected from among the plurality based on both the transition probabilities and other information, such as based on a time associated with the current geolocation event and the corresponding time bins discussed above with reference to process 60, or selecting transition probabilities specific to both a sequence of events and some contextual variable, like an attribute of the user (e.g., gender, age, or other demographic or psychographic attributes), the current weather, traffic conditions, and the like. For example, the transition probabilities may be weighted according to values based on the contextual variable, and a highest weighted probability may determine the subsequent place prediction. In one example, certain places may be rendered more probable in good weather, so current weather of sunny at the place may correspond to a weight of 1.2, increasing the weighted probability score.

Next, some embodiments may select content based on the predicted subsequent geographic place, as indicated by block 82. Selecting content may include identifying the place and selecting a map from the user's current geolocation to the place. In some embodiments, selecting content may include retrieving from memory deals, coupons, rebates, cash-back offers, or gift cards pertaining to the subsequent geographic place, like in response to determining the content to be redeemable at the subsequent geographic place. In some cases, selecting content may include selecting reviews pertaining to the subsequent geographic place, such as restaurant reviews or customer service reviews.

In some embodiments, the selected content is selected from among content for a plurality of highest ranking subsequent geographic places based both on the respective transition probability and an inferred likelihood of user engagement with the content. For example, a plurality of highest ranking subsequent geographic places according to probability may be predicted, such as a threshold number or those having a greater than a threshold probability. Content may then be selected by weighting the probabilities according to an estimated likelihood of engaging with that content to create a modified probability. Content may be selected according to the content having the highest modified probability. For instance, a subsequent geographic place may have a slightly lower probability of being visited by the user given a previous sequence, but the subsequent geographic place may have a substantially higher likelihood of user engagement with corresponding content pertaining to that place, such as click-throughs; shares in social media; redemption of coupons, offers, rebates, cash-back offers, gift cards; or views of or commentary on reviews, or the like. In this scenario, some embodiments may select the content for the slightly less probable subsequent geographic place.

Next, some embodiments may send the selected content to a mobile computing device that sent the received respective geolocation, as indicated by block 84. In some cases, sending the content includes sending instructions to present a notification to the user with a native mobile application executing as a background process on the user's mobile computing device. In some cases, the instructions are sent predictively, before the user engages with the application to request the content that is sent. In some cases, the content is sent along with conditional instructions, such as with a geofence definition associated with the subsequent place, and some embodiments may present the content in response to determining that the user traversed the geofence. Some embodiments may send predicted content associated with a plurality of most likely subsequent places, along with such conditional instructions to avoid overloading the user with excessive notifications, while ensuring that relevant content is available at a later time even in the absence of a network connection.

To conserve memory and expedite computer operations, some embodiments may aggregate places according to the type of place, e.g., according to a taxonomy of places, like a business taxonomy. Some embodiments may train models to predict a subsequent type of place based on sequences of types of places in the historical geolocation event log. For instance, some embodiments may determine that there is a 20% probability of a user transitioning to a coffee shop after visiting a fast casual dining business and a sporting goods retailer in sequence. Later, in response to determining in real time that a given user has transitioned from a fast casual dining business to a sporting goods retailer, and that 20% is the highest probability among candidate subsequent types of places, some embodiments may select content corresponding to coffee shops, e.g., advertisements, reviews, recommendations, coupons, deals, cash-back offers, rebates, gift cards, routes, and the like. In some embodiments, grouping places by type may reduce the dimensionality of the analysis and render model training tractable with a given amount of computing resources.

Some embodiments may refine the models based on later acquired data. For instance, some embodiments may repeat the process of FIG. 3 periodically. Or some embodiments may adjust probabilities on an ongoing basis in response to incorrect predictions.

Figure 5:
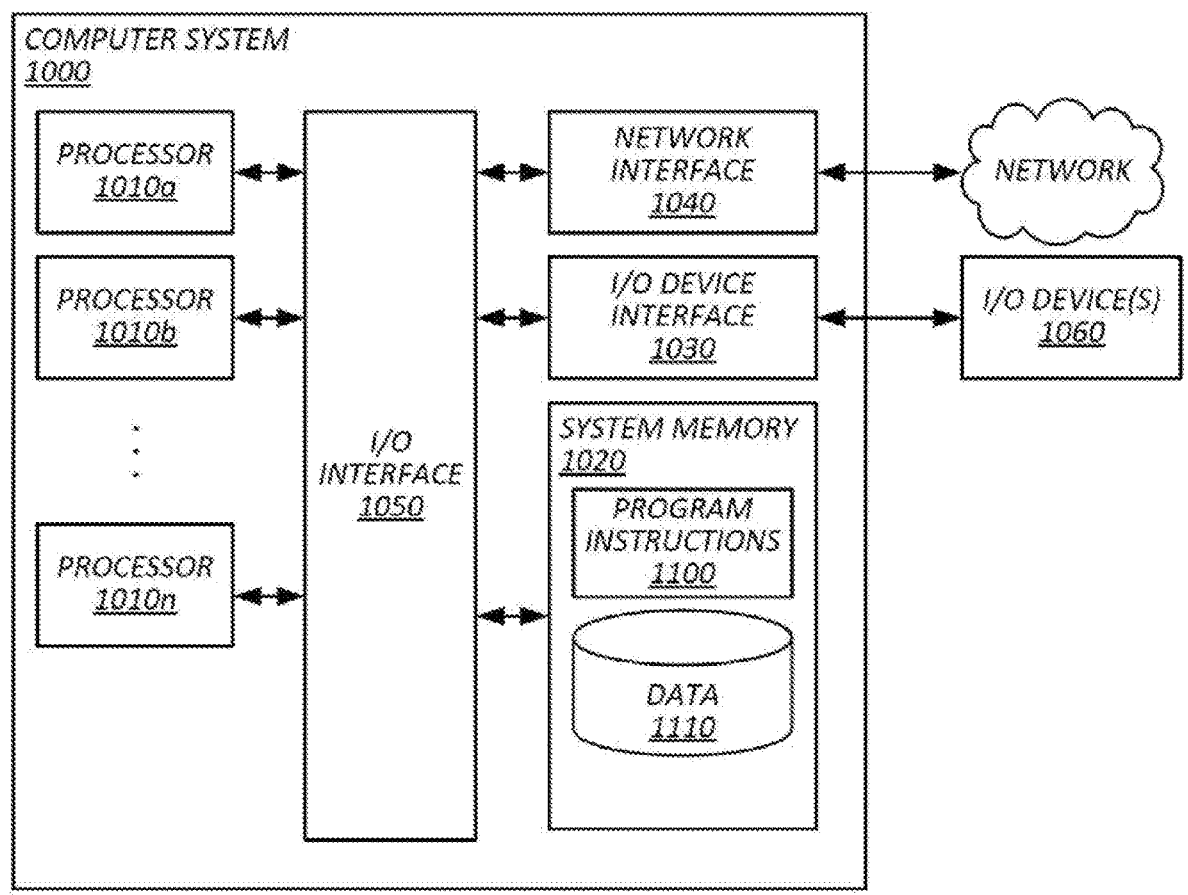
FIG. 5 shows an example of a computer system by which the present techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A system, comprising: one or more processors; and memory storing instructions that when executed by at least some of the processors effectuate operations comprising: training a machine learning model to predict subsequent geolocations of an individual, wherein training the machine learning model comprises: obtaining a set of historical geolocations of more than 500 individuals, the set of historical geolocations indicating geographic places visited by the individuals and the sequence with which the places were visited, the set of historical geolocations indicating a median number of places greater than or equal to three for the 500 individuals over a trailing duration of time extending more than one day in the past; obtaining a set of geographic places including at least 500 geographic places each corresponding to at least one of the historical geolocations; segmenting the historical geolocations into a plurality of temporal bins, each temporal bin having a start time and an end time, wherein segmenting comprises assigning the historical geolocations to a given temporal bin in response to determining that a corresponding historical geolocation is time-stamped with a time after a respective start time and before a respective end time of the given temporal bin; and for each of the segments, determining pairwise transition probabilities between the set of geographic places based on the historical geolocations in the respective temporal bin to form a transition matrix, wherein: a first dimension of the transition matrix corresponds to a first previous geographic place, a second dimension of the transition matrix corresponds to a second previous geographic place preceding the first previous geographic place, a third dimension of the transition matrix corresponds to a subsequent geographic place, and values of the transition matrix correspond to respective conditional probabilities of moving from the first previous geographic place to the subsequent geographic place given that the second previous geographic place precedes the first previous geographic place in a sequence of places visited by an individual; configuring a real-time, next-place-prediction stream-processor compute cluster by assigning a first subset of the transition probabilities corresponding to a first computing device in the compute cluster and assigning a second subset of the transition probabilities to a second computing device in the compute cluster; after configuring the stream-processor compute cluster, receiving, with the stream-processor compute cluster, a geolocation stream indicative of current geolocations of individuals, wherein the geolocation stream comprises over 1,000 geolocations per hour; for each geolocation in the stream, within thirty minutes of receiving the respective geolocation, predicting a subsequent geolocation and acting on the prediction, wherein predicting a subsequent geolocation and acting on the prediction comprises: selecting a computing device in the compute cluster in response to determining that the computing device contain transition probabilities for the received respective geolocation; with the selected computing device, selecting transition probabilities applicable to the received respective geolocation from among the subset of transition probabilities assigned to the selected computing device; predicting a subsequent geographic place based on the selected transition probabilities; selecting content based on the predicted subsequent geographic place; and sending the selected content to a mobile computing device that sent the received respective geolocation.

2. The system of embodiment 1, wherein: a fourth dimension of the transition matrix corresponds to a third previous geographic place preceding the second previous geographic place, and wherein values of the transition matrix correspond to respective conditional probabilities of moving from the first previous geographic place to the subsequent geographic place given that the second previous geographic place precedes the first previous geographic place and given that the third previous geographic place precedes the second previous geographic place in a sequence of places visited by an individual.

3. The system of any of embodiments 1-2, comprising: pruning the transition matrix to remove values that indicate less than a threshold probability and forming a directed, weighted transition graph from the pruned transition matrix.

4. The system of any of embodiments 1-3, wherein training the machine learning model comprises: storing the set of historical geolocations in a distributed file system of another compute cluster and executing a MapReduce routine with the other compute cluster to concurrently determine at least some of the transition probabilities.

5. The system of any of embodiments 1-4, wherein predicting a subsequent geolocation comprises: ingesting the geolocation stream into the compute cluster; and predicting the subsequent geographic place with a data pipeline having parallel branches in a topology specified by data transformations and streams between the data transformations.

6. The system of any of embodiments 1-5, wherein selecting content and sending content are performed predictively, without the content being explicitly requested by a user.

7. The system of any of embodiments 1-6, wherein the transition matrix comprises a fourth dimension corresponding to an attribute of user profiles of individuals corresponding to the historical geolocations, and wherein different transition probabilities are determined for a given transition corresponding to different values of the attribute.

8. The system of any of embodiments 1-7, wherein segmenting the historical geolocations into a plurality of temporal bins comprises segmenting the temporal bins into geospatial bins.

9. The system of any of embodiments 1-8, comprising: pruning values of the matrix that satisfy a threshold; and compressing the pruned matrix into three vectors.

10. The system of any of embodiments 1-9, comprising: compressing the transition matrix into a set of patterns by detecting sequences of visits to geographic places having higher than a threshold probability and consolidating the detected sequences based on attributes of places in the detected sequences.

11. The system of any of embodiments 1-10, wherein selecting a computing device in the compute cluster comprises: parsing a field from a time-stamped tuple containing the received respective geolocation in the stream; and selecting the computing device based on a hash value generated based on the parsed field.

12. The system of any of embodiments 1-11, wherein the matrix encodes a complete trigraph of the set of geographic places.

13. The system of any of embodiments 1-12, wherein selecting a computing device in the computing cluster comprises: instructing the selecting computing device to process at least part of the stream with a remote procedure call implementing a Thrift protocol or a protocol buffer.

14. The system of any of embodiments 1-13, wherein predicting a subsequent geographic place comprises: predicting a subsequent geographic place based on a state of a neuron in a directed cycle of an artificial neural network.

15. The system of any of embodiments 1-14, wherein predicting a subsequent geographic place comprises: determining which of the selected transition probabilities has a highest probability among the selected probabilities; and determining that the subsequent geographic place is a geographic place corresponding to a position in the third dimension of the transition matrix.

16. The system of any of embodiments 1-15, wherein predicting a subsequent geographic place comprises: retrieving from memory a previous place visited by an individual corresponding to the received respective geolocation; retrieving from memory of the selected computing device transition probabilities corresponding to a sequence of visits including both the previous place and the received respective geolocation.

17. The system of any of embodiments 1-16, wherein predicting a subsequent geographic place comprises: selecting a subsequent place of interest according to both a transition probability and a response rate associated with content pertaining to the subsequent place of interest.

18. The system of any of embodiments 1-17, wherein predicting a subsequent geographic place comprises: predicting the subsequent geographic place with means for predicting the subsequent geographic place.

19. The system of any of embodiments 1-18, wherein selecting content corresponding to the predicted subsequent geographic place comprises: selecting content corresponding to the predicted subsequent geographic place with means for selecting content corresponding to the predicted subsequent geographic place.

20. The system of any of embodiments 1-19, wherein selecting content comprises: selecting content based on the predicted subsequent geographic place and other attributes including either user affinity or content popularity.

21. A method, comprising: the operations of any of embodiments 1-20.

22. A tangible, non-transitory, machine-readable media storing instructions that when executed by a data processing apparatus effectuate operations comprising: the operations of any of embodiments 1-20.

What is claimed is:

1. A system, comprising:
one or more processors; and
memory storing instructions that when executed by at least some of the processors effectuate operations comprising:
training a machine learning model to predict subsequent geolocations of an individual, wherein training the machine learning model comprises:
obtaining a set of historical geolocations of more than 500 individuals, the set of historical geolocations indicating geographic places visited by the individuals and the sequence with which the places were visited, the set of historical geolocations indicating a median number of places greater than or equal to three for the 500 individuals over a trailing duration of time extending more than one day in the past;
obtaining a set of geographic places including at least 500 geographic places each corresponding to at least one of the historical geolocations;
segmenting the historical geolocations into a plurality of temporal bins, each temporal bin having a start time and an end time, wherein segmenting comprises assigning the historical geolocations to a given temporal bin in response to determining that a corresponding historical geolocation is timestamped with a time after a respective start time and before a respective end time of the given temporal bin; and
for each of the segments, determining pairwise transition probabilities between the set of geographic places based on the historical geolocations in the respective temporal bin to form a transition matrix, wherein:
a first dimension of the transition matrix corresponds to a first previous geographic place,
a second dimension of the transition matrix corresponds to a second previous geographic place preceding the first previous geographic place,
a third dimension of the transition matrix corresponds to a subsequent geographic place, and
values of the transition matrix correspond to respective conditional probabilities of moving from the first previous geographic place to the subsequent geographic place given that the second previous geographic place precedes the first previous geographic place in a sequence of places visited by an individual;
configuring a real-time, next-place-prediction stream-processor compute cluster by assigning a first subset of the transition probabilities corresponding to a first computing device in the compute cluster and assigning a second subset of the transition probabilities to a second computing device in the compute cluster;
after configuring the stream-processor compute cluster, receiving, with the stream-processor compute cluster, a geolocation stream indicative of current geolocations of individuals, wherein the geolocation stream comprises over 1,000 geolocations per hour;
for each geolocation in the stream, within thirty minutes of receiving the respective geolocation, predicting a subsequent geolocation and acting on the prediction, wherein predicting a subsequent geolocation and acting on the prediction comprises:

selecting a computing device in the compute cluster in response to determining that the computing device contains transition probabilities for the received respective geolocation;

with the selected computing device, selecting transition probabilities applicable to the received respective geolocation from among the subset of transition probabilities assigned to the selected computing device;

predicting a subsequent geographic place based on the selected transition probabilities;

selecting content based on the predicted subsequent geographic place; and sending the selected content to a mobile computing device that sent the received respective geolocation.

2. The system of claim 1, wherein:

a fourth dimension of the transition matrix corresponds to a third previous geographic place preceding the second previous geographic place, and wherein values of the transition matrix correspond to respective conditional probabilities of moving from the first previous geographic place to the subsequent geographic place given that the second previous geographic place precedes the first previous geographic place and given that the third previous geographic place precedes the second previous geographic place in a sequence of places visited by an individual.

3. The system of claim 1, comprising:

pruning the transition matrix to remove values that indicate less than a threshold probability and forming a directed, weighted transition graph from the pruned transition matrix.

4. The system of claim 1, wherein training the machine learning model comprises: storing the set of historical geolocations in a distributed file system of another compute cluster and executing a MapReduce routine with the other compute cluster to concurrently determine at least some of the transition probabilities.

5. The system of claim 1, wherein predicting a subsequent geolocation comprises:

ingesting the geolocation stream into the compute cluster; and predicting the subsequent geographic place with a data pipeline having parallel branches in a topology specified by data transformations and streams between the data transformations.

6. The system of claim 1, wherein selecting content and sending content are performed predictively, without the content being explicitly requested by a user.

7. The system of claim 1, wherein the transition matrix comprises a fourth dimension corresponding to an attribute of user profiles of individuals corresponding to the historical geolocations, and wherein different transition probabilities are determined for a given transition corresponding to different values of the attribute.

8. The system of claim 1, wherein segmenting the historical geolocations into a plurality of temporal bins comprises segmenting the temporal bins into geospatial bins.

9. The system of claim 1, comprising:

pruning values of the matrix that satisfy a threshold; and compressing the pruned matrix into three vectors.

10. The system of claim 1, comprising:

compressing the transition matrix into a set of patterns by detecting sequences of visits to geographic places having higher than a threshold probability and consolidating the detected sequences based on attributes of places in the detected sequences.

11. The system of claim 1, wherein selecting a computing device in the compute cluster comprises:

parsing a field from a time-stamped tuple containing the received respective geolocation in the stream; and selecting the computing device based on a hash value generated based on the parsed field.

12. The system of claim 1, wherein the matrix encodes a complete trigraph of the set of geographic places.

13. The system of claim 1, wherein selecting a computing device in the computing cluster comprises:

instructing the selecting computing device to process at least part of the stream with a remote procedure call protocol.

14. The system of claim 1, wherein predicting a subsequent geographic place comprises:

predicting a subsequent geographic place based on a state of a neuron in a directed cycle of an artificial neural network.

15. The system of claim 1, wherein predicting a subsequent geographic place comprises:

determining which of the selected transition probabilities has a highest probability among the selected probabilities; and determining that the subsequent geographic place is a geographic place corresponding to a position in the third dimension of the transition matrix.

16. The system of claim 1, wherein predicting a subsequent geographic place comprises:

retrieving from memory a previous place visited by an individual corresponding to the received respective geolocation;

retrieving from memory of the selected computing device transition probabilities corresponding to a sequence of visits including both the previous place and the received respective geolocation.

17. The system of claim 1, wherein predicting a subsequent geographic place comprises:

selecting a subsequent place of interest according to both a transition probability and a response rate associated with content pertaining to the subsequent place of interest.

18. The system of claim 1, further comprising:

means for predicting the subsequent geographic place.

19. The system of claim 1, further comprising:

means for selecting content corresponding to the predicted subsequent geographic place.

20. The system of claim 1, wherein selecting content comprises:

selecting content based on the predicted subsequent geographic place and other attributes including either user affinity or content popularity.

21. A method, comprising:

training a machine learning model to predict subsequent geolocations of an individual, wherein training the machine learning model comprises:

obtaining a set of historical geolocations of more than 500 individuals, the set of historical geolocations indicating geographic places visited by the individuals and the sequence with which the places were visited, the set of historical geolocations indicating a median number of places greater than or equal to three for the 500 individuals over a trailing duration of time extending more than one day in the past;

obtaining a set of geographic places including at least 500 geographic places each corresponding to at least one of the historical geolocations;

segmenting the historical geolocations into a plurality of temporal bins, each temporal bin having a start time and an end time, wherein segmenting comprises assigning the historical geolocations to a given temporal bin in response to determining that a corresponding historical geolocation is timestamped with a time after a respective start time and before a respective end time of the given temporal bin; and for each of the segments, determining pairwise transition probabilities between the set of geographic places based on the historical geolocations in the respective temporal bin to form a transition matrix, wherein:
- a first dimension of the transition matrix corresponds to a first previous geographic place,
- a second dimension of the transition matrix corresponds to a second previous geographic place preceding the first previous geographic place,
- a third dimension of the transition matrix corresponds to a subsequent geographic place, and
- values of the transition matrix correspond to respective conditional probabilities of moving from the first previous geographic place to the subsequent geographic place given that the second previous geographic place precedes the first previous geographic place in a sequence of places visited by an individual;

configuring a real-time, next-place-prediction stream-processor compute cluster by assigning a first subset of the transition probabilities corresponding to a first computing device in the compute cluster and assigning a second subset of the transition probabilities to a second computing device in the compute cluster;

after configuring the stream-processor compute cluster, receiving, with the stream-processor compute cluster, a geolocation stream indicative of current geolocations of individuals, wherein the geolocation stream comprises over 1,000 geolocations per hour;

for each geolocation in the stream, within thirty minutes of receiving the respective geolocation, predicting a subsequent geolocation and acting on the prediction, wherein predicting a subsequent geolocation and acting on the prediction comprises:

selecting a computing device in the compute cluster in response to determining that the computing device contains transition probabilities for the received respective geolocation;

with the selected computing device, selecting transition probabilities applicable to the received respective geolocation from among the subset of transition probabilities assigned to the selected computing device;

predicting a subsequent geographic place based on the selected transition probabilities;

selecting content based on the predicted subsequent geographic place; and sending the selected content to a mobile computing device that sent the received respective geolocation.

* * * * *